United States [11] 3,609,008

[72] Inventors Joseph F. Dillon, Jr.
Morris Township, Morris County;
Howard J. Guggenheim, Somerville, both of N.J.
[21] Appl. No. 771,544
[22] Filed Oct. 29, 1968
[45] Patented Sept. 28, 1971
[73] Assignee Bell Telephone Laboratories, Incorporated
Murray Hill, Berkeley Heights, N.J.

[54] THALLIUM IRON FLUORIDE AND DEVICES UTILIZING SAME
8 Claims, 4 Drawing Figs.

[52] U.S. Cl. .................................................. 350/151, 23/88
[51] Int. Cl. .................................................. G02f 1/22
[50] Field of Search ........................................... 23/88; 350/151

[56] References Cited
UNITED STATES PATENTS
3,368,861 2/1968 Rubinstein et al. ............ 350/151
3,485,551 12/1969 Guggenheim et al. ......... 350/151

OTHER REFERENCES

A. Tressand et al, *Les Systèmes MF-FeF$_2$ (M = Li, Na, Rb, Tl),* "Cr. Acad. Sci. Paris," Ser. C 1968 266 (13), pp. 984–86

*Primary Examiner*—Rodney D. Bennett, Jr.
*Assistant Examiner*—N. Moskowitz
*Attorneys*—R. J. Guenther and Edwin B. Cave

ABSTRACT: Thallium iron fluoride (TlFeF$_3$) appears to be isostructural with RbFeF$_3$. Described device uses depend primarily on the magneto-optic effect below the Curie temperature of about 77° K.

THALLIUM IRON FLUORIDE AND DEVICES UTILIZING SAME

BACKGROUND OF THE INVENTION

1. Field of the Invention

The invention is concerned with crystalline magnetic materials. Such materials in single crystal form are known to manifest magneto-optic properties for electromagnetic radiation of wavelengths for which the materials transparent. Other device uses for magnetic materials are based on a variety of properties including magnetostriction, reverse magnetostriction, etc.

2. Description of the Prior Art

It is now generally recognized that only a very small class of materials evidence spontaneous magnetic polarization. From the device standpoint, a significant part of even this small class is of only limited practical interest. These are the antiferromagnetic materials which evidence little or no external moment at reasonable applied field values.

Within the class of spontaneous magnetic materials evidencing external moment (ferrimagnetic, ferromagnetic, canted anitferromagnetic, metamagnetic), a still further reduced number have sufficient transparency for electromagnetic radiation is given wavelength ranges to be of interest as optical elements.

A recently developing branch of applied science, that dealing with devices utilizing coherent electromagnetic radiation, emphasizes this fact. Of the various ways for modulating laser-produced radiation, devices dependent upon magneto-optic properties constitute one of the very small number of useful classes. In fact, only two or three experimentally demonstrated systems have resulted in modulation of coherent light with a bandwidth considered competitive with communications systems now in use at microwave frequencies. One of these is based on a magneto optic interaction and utilizes YIG (yttrium iron garnet). Unfortunately, the high frequency absorption edge for YIG is at the red end of the visible spectrum, and this material is, therefore, not useful over the major part of the visible light spectrum.

More recently, it was discovered that rubidium iron fluoride ($RbFeF_3$) showing a transparency over essentially the entire visible spectrum is a canted-spin antiferromagnet and manifests sufficient magneto-optic rotation over this spectrum to be of interest in modulators (see Physical Review Letters, Vol 19, No. 17, p. 948 Oct. 1967).

SUMMARY OF THE INVENTION

The novel composition represented by the formula $TlFeF_3$ has been found to share many of the characteristics of $RbFeF_3$. The new material is apparently isostructual with $RbFeF_3$ at least in some of its phases, and is a canted-spin antiferromagnet below its Curie point of about 77° K. and is transparent over the wavelength range of approximately 4,000 A. to 9,000 A. Over a temperature range of some 20° or 30° Kelvin below the Curie point, the net spontaneous polarization lies in a <100 >direction. The <100 >directions are also nonbirefringent. Crystalline anisotropy is sufficiently high so that the magnetization is not easily made to lie in any direction other than <100 >. Device properties of interest include a high specific rotation for plane-polarized electromagnetic radiation (ranges from about 1,600° /cm. at 4,000° A. to 300° /cm. at 8,000 A.). The composition also manifests significant magnetostriction and inverse magnetostriction.

Physical and chemical characteristics are generally suitable for device fabrication. $TlFeF_3$ is congruently melting and has a reasonably low vapor pressure at its melting point, permitting use of a variety of crystal growth techniques. Crystals grown to date show only minor imperfections and, at least at this stage, appear to be optically superior to crystals of $RbFeF_3$.

$TlFeF_3$ is stable and is generally unaffected by most encountered physical and chemical environments. It is easily cut and polished to a form required for optical device use.

The most significant use for the new composition is in devices which owe their utility to magneto-optic properties, and the preferred embodiment of the invention is accordingly described.

DETAILED DESCRIPTION

Figure 1:
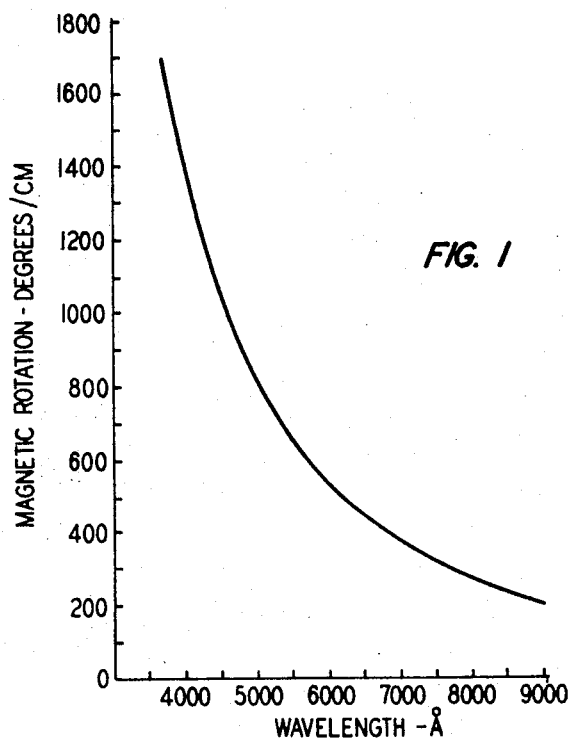
FIG. 1, on coordinates of magnetic rotation in degrees per centimeter on the ordinate and wavelength in angstrom units on the abscissa, is a plot showing the relationship between these two parameters for the composition of the invention.
Figure 2:
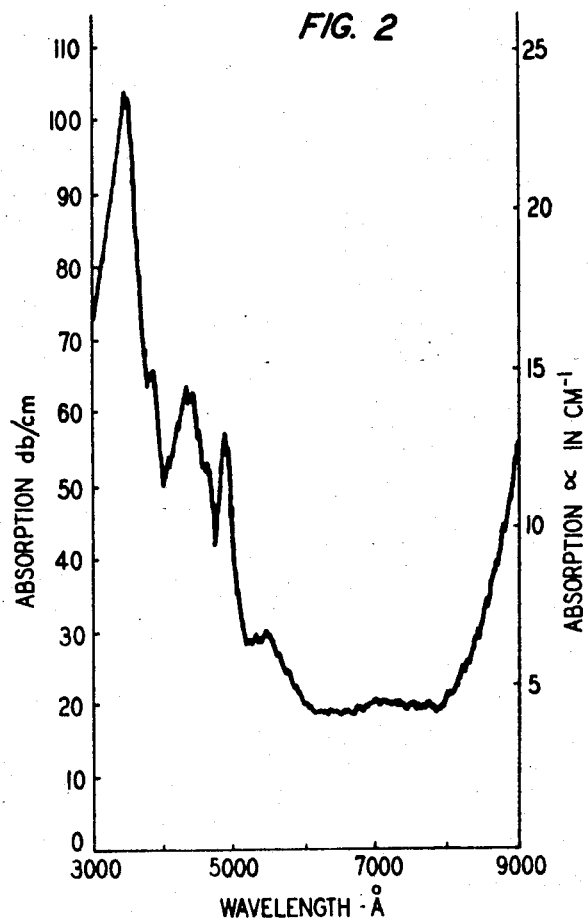
FIG. 2 on coordinates of absorption in both db./cm. and reciprocal centimeters on the ordinate and wavelength in angstrom units n the abscissa, is a plot showing the relationship between absorption and wavelength for the composition of the invention.

Referring to FIGS. 1 and 2, it is seen that $TlFeF_3$ manifests substantial rotation and transparency over the entire visible spectrum out into the ultraviolet. From FIG. 1, it is seen that a rotation of about 400° per centimeter at 0.7 micron or 7,000 A. is the minimum value for the visible spectrum. A maximum value well in excess of 3,000° per centimeter is measured at 3,000 A. in the ultraviolet.

The measurements plotted in FIG. 1 were made with a single crystal section of $TlFeF_3$ magnetically saturated in an easy direction (<100>) parallel to the light propagation direction. The light beam was plane polarized. Rotation was measured by use of an analyzer consisting of a plane-polarizing medium and an amplitude detector. Light sources used included a Xenon high-pressure lamp in conjunction with a monochromator.

The fact that rotation increases with frequency as seen from FIG. 1 is not unusual (many previously measured magnetic materials such as YIG show such increase as the UV is approached) and, further, is well founded theoretically. It is interesting to note that the curve form is smooth and shows no marked perturbations as have been observed in many other materials. Of course, while increasing characteristic rotation with frequency has been often observed, even the maximum value so obtained is not necessarily of sufficient magnitude to be usable in a real operating device.

Alternate of the more significant features of $TlFeF_3$ is its absorption, $\alpha$. In FIG. 2, this characteristic is plotted as a function of wavelength. $\alpha$ is defined in accordance with the relationship $$I = I_0(e^{-\alpha x})$$

where
- $I$ equals incident intensity,
- $I$ equals transmitted intensity,
- $x$ equals length of transmission path through medium, nd
- $e$ is the natural logarithm base. If $x$ is measured in centimeters, $\alpha$ is in units of reciprocal centimeters or cm.[11]. If, for example, the absorption is 4 cm.[11] as it is for a wavelength within the range of from 6,000 to 8,000 A., then the intensity of the beam is reduced to $1/e$th of its incident or $I_0$ value over a path length of about one-fourth centimeter.

Since many modulators and isolators are designed to produce a maximum rotation of 45° it is possible to calculate a figure of merit or a real loss value from the data of FIGS. 1 and 2. As an example, for helium-neon laser operating with 0.6328 A. transition, the rotation is about 480° per centimeter and the absorption is about 4 cm.[11]. The length of the unit required for 45° rotation is therefore about 0.096 centimeter, and the loss for this length crystal is about 33° percent.

Figure 3:
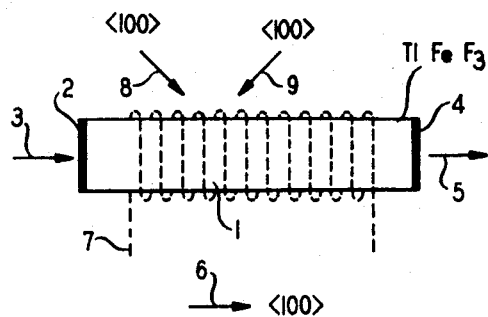
FIG. 3 is a front elevational view of a device using a crystal of thallium iron fluoride.

In FIG. 3, the element shown consists of a crystalline body 1 of thallium iron fluoride. Provision comprising optically polished surface 2 is made for introduction of a plane-polarized beam 3 of electromagnetic radiation. In similar fashion, provision is made for extraction of electromagnetic radiation comprising an optically polished surface such as 4. The exiting beam is denoted 5. Alternative forms may, of course, utilize but one surface, such as 2, both for introduction and extraction of the beam. In the figure, the light beam direction 6 is designated as one of the family of crystallographic 100 directions. TlFeF$_3$ is a canted antiferromagnet with the cant direction or easy magnetization direction lying along a <100 >direction.

As in all magneto-optic devices, maximum rotation is obtained for a beam direction corresponding with a magnetization direction. The coercivity of TlFeF$_3$ is sufficiently high so that practical device operation requires that the magnetization be in a <100 >direction. The remanent magnetization of TlFeF$_3$ is sufficient to keep the material magnetically saturated without an applied external field for an aspect ratio of about 10:1 Operation of the device of FIG. 3 utilizes fixed degrees of rotation which may correspond, for example, with magnetizations, on the one hand, parallel with and, on the other hand, antiparallel with the light beam.

Where it is desired to change the light transmission properties of body 1 for light beam 3, this may be accomplished by pulsing body 1 by use, for example of conductive winding 7 at a level sufficient to bring about a reversal of the magnetization.

TlFeF$_3$ manifests a significant magnetically induced birefringence. Again, due to the coercivity of the material, magnetization directions producing such birefringence are expediently along one of the <100 >axes 8 or 9 normal to the beam. The sign of the induced birefringence is independent of the direction of the magnetization on any given axis. Use of this mechanism, therefore, affords two additional modulation levels.

A detailed description of the various modes of operation of the devices of FIG. 3 is not considered appropriate to this description. Briefly, however, the device may be utilized as a simple isolator in which vent the crystal of TlFeF$_3$ is magnetized in a given direction, preferably a beam direction. The magnetic state is thereafter maintained and the device operates simply as a static rotator. Proper selection of crystal length results in an appropriate rotation for example, of 45°. Since magnetic rotation is nonreciprocal, any energy of the permitted polarization entering through surface 4 rotates an additional 45° upon its traversal and, accordingly, may be blocked by a polarizer.

In a different arrangement, two or three discrete polarization states may result. Since rotation is sensitive to a change in direction of the magnetization (of course, providing that the direction is such that there is a component in the beam direction), two discrete rotations result from a reversal, for example, for a magnetization direction lying along the axis of beam traversal. These two rotations are equal in magnitude and opposite in sign. A third state corresponds to an orthogonal magnetization direction. For the simple case in which this is normal to the beam traversal direction, no magnetization component results in such traversal direction and the beam travels through the crystal without magnetic rotation. Of course, beam traversal directions which do not coincide with <100 >crystallographic directions may result in twice as many polarization states as there are magnetization axis having different value components in the traversal direction.

Devices, dependent in part or in whole on induced birefringence, ordinarily rely on the change in relative values of refractive index for the two polarized components of a given wave. For the effect to be seen by use of a polarizing analyzer, the polarization plane of the beam must, at least at some time during traversal, be nonparallel with a major crystallographic direction. Alternatively, the polarization plane of the beam may include a major crystallographic direction in which event the modulating influence is seen in terms of a phase or frequency shift. Devices may, of course, depend for their operation on a combination of these manifestations. Information may be imparted to the beam in the form of simple magnetic rotation and/or as the elliptical polarization (or phase or frequency shift) resulting from induced birefringence.

Another possible mode of operation results in a phase change or in a frequency change brought about by a magnetization component along the beam traversal axis. In such operation, beam 3 is circularly rather than plane polarized with the magnetization component in the direction of the beam traversal direction resulting simply in a variation in path length.

Figure 4:
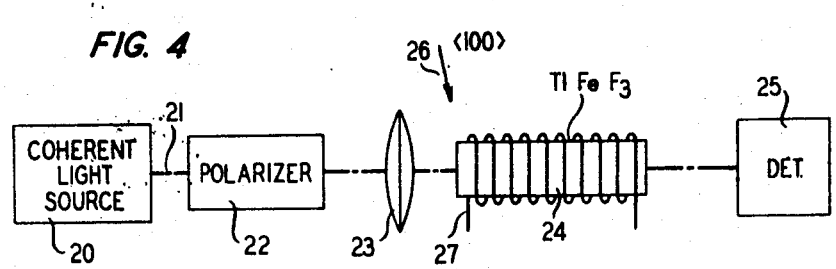
FIG. 4 is a schematic representation of a system using a modulator dependent for its operation on a crystal of $TlFeF_3$.

FIG. 4 is illustrative of systems useful for communications and other purposes. The apparatus of this figure consists of laser oscillator 20 producing light beam 21, which passes through plane polarizer 22, focusing means 23, TlFeF$_3$ modulator 24 and detector 25 in succession. An applied pulse field 26 is applied in a <100 >direction which, for this example, is assumed to have a component in the beam traversal direction. The magnitude of the pulse is sufficient to rotate the magnetization. In common with other modulation apparatus, the relative polarization directions of elements 22 and 25 depend upon the desired mode of operation. They may be at a given angle so as to block transmission for a given magnetization direction or they may be at a different angle to permit maximum transmission for such direction. Other angles may be chosen to optimize any of the operational modes discussed in conjunction with FIG. 3.

Alternate modes of operation are known. They include, for example, application of a DC field at some angle other than orthogonal to the beam direction. They include also the use of a completely reflecting end surface at the termination of the beam transversal path so as to result in a double-pass device. Such mode of operation, of course, requires some means for separating the incoming and outcoming energy. Such means may include a Wollaston prism and, depending upon crystal length and other opening conditions, may also include a static rotator. Such alternate arrangements are not considered a necessary part of this description and are, therefore, not depicted.

GROWTH

TlFeF$_3$ may be grown by several techniques. Since the material is congruently melting (with a melting point of about 845° C.) and has a reasonably low vapor pressure at its melting point (probably less than one tenth mm.), the preferred techniques involve growth from a melt of stoichiometric composition. Crystals on which some of the measurements set forth were grown by a zone-refining technique and/or by modified Bridgman technique. While these procedures are merely illustrative, they are expedient. The procedures are described generally.

ZONE-MELTING TECHNIQUE

In accordance with this procedure, powdered thallium fluoride is placed in an 8 in. boat constructed of graphite or platinum, and this material is zone refined in an inert atmosphere by passage at from 1 to 10 cm. per hour through a single heater with one pass. Since most significant impurities have a distribution coefficient numerically less than one, they are concentrated in the final portion to freeze. The rod is cropped to remove this contaminated (and discolored) section.

The refining procedure is but one technique for removing normally present impurities such as water and products of hydrolysis such as thallium oxide, thallium hydroxide and thallium oxyfluoride. Such products, if permitted to remain, result in inhomogeneities and, consequently, in light scattering in the final crystal Alternate techniques include removal of moisture at room temperature in a vacuum.

All procedures in which the thallium fluoride or the final composition is heated to temperature of 100° C. or above require exclusion of moisture and oxygen. Most of the described work was carried out in an inert atmosphere of nitrogen or helium.

At the termination of the zone-refining step, the thallium fluoride appears as a water-white crystalline mass which may or may not be single crystal.

Iron fluoride is prepared by heating iron powder to within 50° of the melting point of ferrous fluoride ($FeFe_2$ melts at about 960° C.) in contact with hydrogen fluoride in a boat within a platinum tube. Boat and contents are maintained at such temperature for a period sufficient to bring about the diffusion-limited reaction. For the quantities actually used, it took 2 days to reach completion. During this period, usual precautions were taken to exclude moisture due again to the hydrolizable nature of ferrous fluoride. The final reacted product appears as an off-white powder which is finally melted at a temperature of 960°—1000° C. in the same boat in an inert atmosphere. The solid mass so produced is removed from the boat.

The ferrous fluoride is broken up, the stoichiometric indicated amount is weighed out, and this is evenly distributed on top of the crystalline thallium fluoride, still within the boat in which this material is originally prepared by zone refining. Boat and contents, still within an inert atmosphere of nitrogen or helium, are zone melted, first at a relatively rapid rate of several cm./hr. to form the compound, $TlFeF_3$, and, subsequently, at a sufficiently slow rate to produce the desired crystalline perfection (a rate of about 0.3 cm./hr. has been found appropriate).

BRIDGMAN

While the materials are be initially prepared by a Bridgmane technique, it was found most useful in the further processing of crystals prepared by zone melting as described above. To this end, such a zone-melted crystal of $TlFeF_3$ was broken up and was inserted in a Bridgman crucible made of platinum or graphite. Bridgman crucibles are tapered at their lower extremities, the function of such pointed end being to nucleate single crystal growth. The tapered crucible was sealed in a heavy platinum crucible of approximately the same shape in an inert atmosphere or in a vacuum.

Crucible and contents were melted at about 845° C. and were recrystallized from the tapered end upward at approximately 1 mm. per hour. After crystallization and before removal, the crystal and material were annealed over a schedule which lasted about 2 days. During this period, the crystal was maintained at 700° C. for about 12 hours subsequent to which it was cooled to room temperature at a rate of about 25° per hour.

GENERAL PROPERTIES OF $TlFeF_3$ $TlFeF_3$ is a Perovskite and is paramagnetic above about 102° K. Below this temperature, the compound becomes tetragonal and, from the magnetic standpoint, is a substantially perfect antiferromagnet. At about 77° K., there is a crystallographic first-order transition. The material is further distorted probably to the orthorhombic state. Magnetically, the material evidences spontaneous polarization. Below this Curie point of about 77° K. and down to about 50° K., $TlFeF_3$ is a canted antiferromagnet with the easy direction parallel to a <100> axis. Below about 50° K. and for a temperature interval of about 15° K., the net magnetization is in a <110> direction.

The distortion introduced below the Curie point is fairly small, and it is convenient to described it crystallographically as if it were still cubic. It has been observed that in this ferromagnetic state below 77° K. there is an easy direction which has been identified as corresponding with any of the <100> directions. Reversal of the magnetization along a particular <100> axis or directional change of the magnetization to a different <100> direction is believed accomplished by domain wall motion so that such change in magnetization is believed to include a two-domain state.

Generally, an applied flux of the order to 300 gauss is sufficient to change the magnetization direction.

While substantial deviations from the indicated stiochiometry, $TlFeF_3$, are not generally indicated, there are instances in which compositional variation may optimize a particular device characteristic. For example, since this composition is isomorphous with $RbFeF_3$ and since this latter material has a somewhat higher Curie point, the Curie point of $TlFeF_3$ may be increased by partial substitution of rubidium for thallium. Partial substitution of up to about 50 atom percent is indicated, greater substitution resulting in a product more characteristic of $RbFeF_3$. Such partial replacement assures a net magnetization above the boiling point of liquid nitrogen at atmospheric pressure. Another example includes alteration of the net magnetization by partial substitution of a nonmagnetic-divalent ion for iron. Where the intended use is optical, such elements should not introduce undesired absorption. Suitable ions are cobalt, vanadium, nickel and manganese, all in the divalent state.

The invention has been described in terms of a limited number of illustrative embodiments. Since device use is likely to take the form of an optical isolator or modulator, description has largely been in such terms. More broadly, the invention is based on the novel composition $TlFeF_3$, per se, and on the various device uses dependent upon the observed magnetic properties of this material.

What is claimed is:

1. Crystalline material comprising a composition represented essentially by the atomic formula $TlFeF_3$.

2. Device comprising a body of crystalline material in accordance with claim 1 including means for launching a beam of wave energy therethrough.

3. Device of claim 2 in which said wave energy is electromagnetic wave energy of a wavelength to which said body is transparent.

4. Device of claim 3 in which the said body is magnetically saturated.

5. Device of claim 4 in which the said means are such that the beam direction beam has a component in a <100> direction.

6. Device of claim 4 in which the direction of body is magnetically saturated and in which the means for introducing the said beam are such that a component of the magnetization lies in the beam direction.

7. Device of claim 4 in which the direction of the said magnetization is normal to the beam direction.

8. Device of claim 4 together with means for changing the magnetization direction.